(12) United States Patent
Stecker

(10) Patent No.: US 6,403,004 B1
(45) Date of Patent: *Jun. 11, 2002

(54) PROCESS FOR MAKING A MULTI-LAYERED SOLID SURFACE ARTICLE

(75) Inventor: William M. Stecker, Chapel Hill, NC (US)

(73) Assignee: Surface Technologies, Inc., Durham, NC (US)

(*) Notice: Subject to any disclaimer, the term of this patent is extended or adjusted under 35 U.S.C. 154(b) by 1099 days.

This patent is subject to a terminal disclaimer.

(21) Appl. No.: 08/505,455

(22) Filed: Jul. 21, 1995

(51) Int. Cl.[7] .............................................. B29C 39/12
(52) U.S. Cl. ...................... 264/139; 264/162; 264/246; 264/255; 264/DIG. 57
(58) Field of Search ................................ 264/162, 246, 264/250, 255, 139, 247, DIG. 57

(56) References Cited

U.S. PATENT DOCUMENTS

| | | | |
|---|---|---|---|
| 298,358 A | * 5/1884 | Edge | 264/139 |
| 1,304,083 A | 5/1919 | Moore | |
| 3,150,032 A | 9/1964 | Rubenstein | 161/161 |
| 3,378,617 A | * 4/1968 | Elmendorf | 264/162 |
| 3,562,375 A | 2/1971 | Guy et al. | 264/131 |
| 3,784,664 A | 1/1974 | Nicklin | 264/246 |
| 4,198,457 A | 4/1980 | Saito et al. | 428/161 |
| 4,466,937 A | 8/1984 | Johnston et al. | 264/256 |
| 4,528,227 A | * 7/1985 | Frechtmann | 264/255 |
| 4,622,191 A | 11/1986 | Takeuchi | 264/134 |
| 4,624,815 A | 11/1986 | Moufarrege | 264/162 |
| 4,650,623 A | 3/1987 | Berger | 264/139 |
| 4,844,850 A | 7/1989 | Harder | 264/129 |
| 4,889,666 A | 12/1989 | Kawasaki | 264/22 |
| 4,959,401 A | 9/1990 | Bellasalma et al. | 523/466 |
| 5,166,230 A | 11/1992 | Stecker | 523/500 |
| 5,169,573 A | 12/1992 | Tsuchida et al. | 264/35 |
| 5,298,212 A | 3/1994 | Stecker | 264/571 |

FOREIGN PATENT DOCUMENTS

| | | |
|---|---|---|
| EP | 0 621 575 A1 | 3/1994 |
| FR | 2 469 263 | 11/1979 |
| JP | 621 49425 | 3/1987 |
| JP | 632 95255 | 2/1988 |
| JP | 215 9201 | 6/1990 |
| JP | 601 45824 | 8/1995 |
| JP | 602 24512 | 11/1995 |

* cited by examiner

Primary Examiner—Jan H. Silbaugh
Assistant Examiner—Edmund H. Lee
(74) Attorney, Agent, or Firm—Myers Bigel Sibley & Sajovec (57) ABSTRACT

A process for producing a decorative article having a face layer of multiple laminae is disclosed. A first curable resin is formed into a first lamina having a face layer with a relief and a substantially planar back layer. The first resin is cured and then a second curable resin is-applied to the face layer of the first lamina. The second resin is cured to produce a second lamina and the first and second laminae are then sanded to provide a decorative article of manufacture having a substantially planar face layer.

19 Claims, 4 Drawing Sheets fig.1.

_fig. 2._

_fig. 3._

_fig. 4._

_Fig. 5._

_Fig. 6._

PROCESS FOR MAKING A MULTI-LAYERED SOLID SURFACE ARTICLE

FIELD AND BACKGROUND OF THE INVENTION

The present invention relates to a process for making a decorative article, and more particularly a solid surface decorative article.

Solid surface articles have been available for over twenty years. The term "solid surface" relates to a material that has substantially the same physical and aesthetic properties throughout its thickness. Thus, if the surface of the material is sanded or planed, a substantially identical aesthetic is found. Solid surface materials are typically molded out of various thermosetting resins such as unsaturated polyester resins. Various aesthetics are produced such as solid color, marbleized color (see, for example, U.S. Pat. No. 5,166,230 to Stecker) and particulate dispersion (see, for example, U.S. Pat. No. 4,959,401 to Bellasalma et al.).

The limitation of these solid surface materials and the processes for making them are that in order to provide other decorative effects such as patterns, inlays or grooves simulating grout or seams, a highly skilled machinist must manually cut the effect into the solid surface material followed by casting a resin having a contrasting color, for example, into the cut portion to provide the decorative effect. This is time consuming and often is not carried out by the manufacturer but by a craftsman in the field. Moreover, such a technique has limited ability for mass production of solid surface materials.

Accordingly, there is a need in the art for a process of providing a decorative article, and particularly a solid surface decorative article that is economic to produce and capable of being done in mass quantities by the manufacturer while avoiding the sacrifice of aesthetics.

SUMMARY OF THE INVENTION

A process for producing a decorative article is provided. A first curable thermosetting resin is formed into a first lamina having a face layer with a relief and a substantially planar back layer. The first curable thermosetting resin is cured using conventional techniques. A second curable thermosetting resin is then cast onto the face layer of the first lamina to follow the relief thereof and to form a second lamina having a face layer and a back layer. The second curable thermosetting resin is cured using conventional techniques. The first and second laminae are then subjected to conditions (e.g., sanding) sufficient to provide a decorative article of manufacture having a face layer with a desired aesthetic characteristic. Exemplary aesthetic characteristics include the face layer being substantially planar or having a profile.

In accordance with another embodiment of the present invention, a first curable thermosetting resin is formed as discussed previously into a first lamina having a face with a relief and a substantially planar back surface and the resin is cured. A second curable thermosetting resin is then cast onto the face layer of the first lamina to follow a portion of the relief thereof to form a second lamina having a face layer and a back layer. The second thermosetting resin is then cured. One or more additional layers of the same or different thermosetting resins are applied to the second lamina to form one or more additional laminae. The laminae are subjected to conditions sufficient to provide a decorative article of manufacture having a substantial planar face layer with a desired aesthetic characteristic.

By utilizing the processes of the present invention, various solid surface decorative articles can be provided having a myriad of aesthetic designs. Moreover such processes are economical and capable of mass production. Exemplary decorative articles include architectural facing, exterior and interior wall panels, bathroom fixtures, in particular, articles having simulated grout, counter tops, table tops and the like. Also, highly detailed inlays may be produced from "bas-relief" molds with two or more colors as inlays.

DETAILED DESCRIPTION OF THE PREFERRED EMBODIMENTS

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

Figure 1:
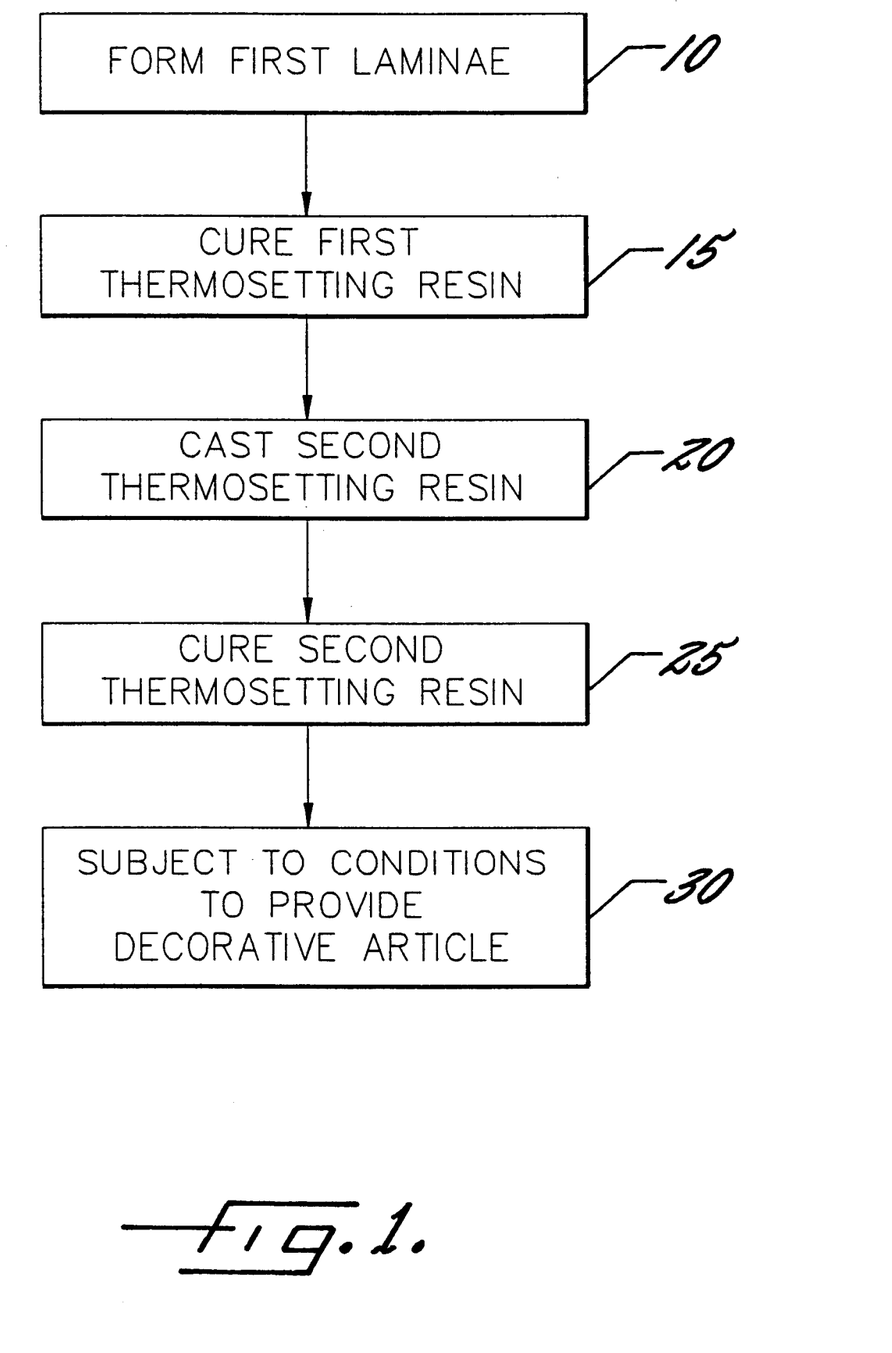
FIG. 1 is a flow diagram illustrating the steps of a method of making a decorative article according to the present invention.

Referring now to FIG. 1, a process for making a decorative article of manufacture according to the present invention is schematically illustrated. The process comprises the steps of forming 10 a first lamina from a first thermosetting resin, curing 15 the first thermosetting resin, casting 20 a second thermosetting resin within recessed portions of the first lamina, curing 25 the second thermosetting resin to form a second lamina, and subjecting 30 the first and second laminae to treatment necessary to provide a decorative article of manufacture having a face layer with a desired aesthetic characteristic. Desired aesthetic characteristics include a substantially planar surface, a profile such as bas-relief, various color effects and the like.

Figure 2:
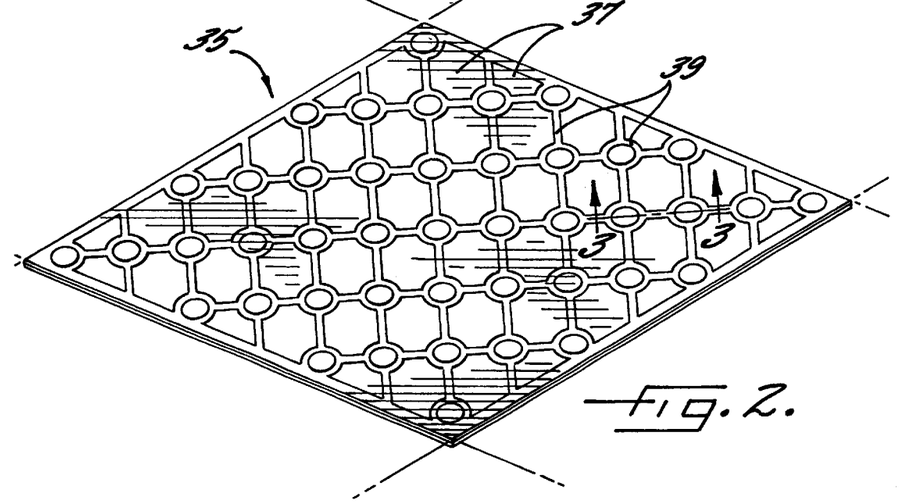
FIG. 2 is a perspective view of a decorative article made by the method according to the present invention.
Figure 3:
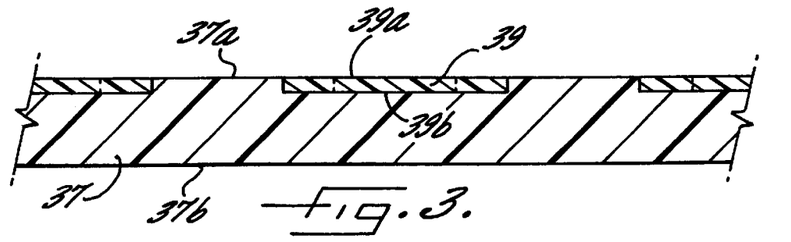
FIG. 3 is a cross-sectional view taken along lines 3—3 in FIG. 2.

Exemplary decorative articles produced by the above process include architectural facing, exterior and interior wall panels, counter tops, tabletops and the like. FIGS. 2 and 3 illustrate a decorative article 35, having first and second laminae 37, 39, produced by the above process that simulates ceramic tiles surrounded by grout. As would be understood by those having skill in the art, a plurality of the decorative articles 35 may be installed on walls, ceilings, and floors to simulate a continuous ceramic tile surface.

Decorative articles may be produced to simulate almost any type of surface and may have almost any pattern and color scheme desired when produced according to the above process.

Figure 4:
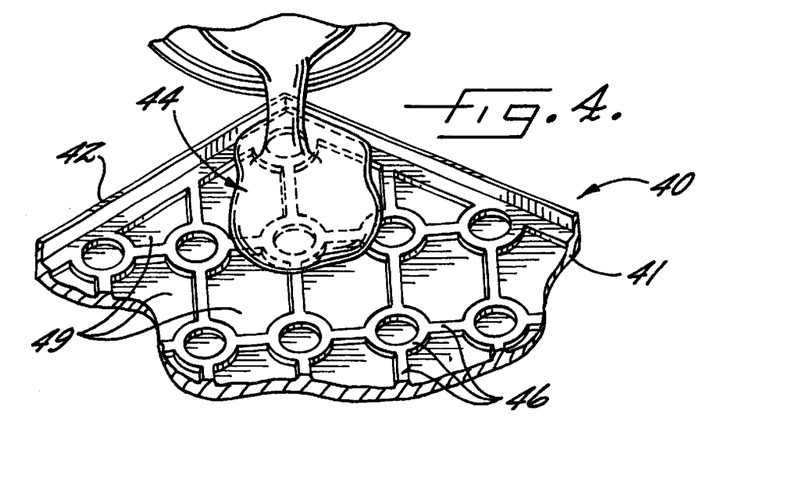
FIG. 4 illustrates applying a first resin to the casting part.

Referring now to FIG. 4, the step of forming 10 the first lamina 37 is illustrated. The first lamina 37 is prepared by preparing a casting part 40 having a base 41 including a continuous side edge 42 defining an area into which a curable first thermosetting resin 44 may be applied. The casting part 40 further comprises a top (not shown) for facilitating the application of heat and pressure to cure the first thermosetting resin 44, as would be understood by those having skill in the art. See, for example, U.S. Pat. No. 5,166,230 to Stecker, which is incorporated herein by reference in its entirety.

The base 41 as shown is square; however, as would be understood by those having skill in the art, other sizes and shapes may be utilized. In the illustrated embodiment, the decorative array of raised portions 46 comprises a pattern of interlocking circles and octagons looking somewhat like a honeycomb.

Preferably, the decorative pattern is aesthetically pleasing and repeats at predetermined intervals which facilitates installing a plurality of decorative articles 35 to simulate a continuous surface having the decorative pattern. For illustration purposes only, each circle in the illustrated embodiment may repeat on 2½ centers. Preferably, the base 41 of the casting part 40 is recessed by an equal amount throughout the decorative pattern. The casting part 40 may be made from a variety of materials such as aluminum, polyethylene, silicone or fiberglass composite and may be cast or machined to produce the decorative pattern, as would be known to those skilled in the art. The casting part 40, including base 41 and the decorative pattern thereon, may be designed and created under computer control. Preferably, the decorative pattern for each solid surface decorative article is designed and stored on a computer. In addition, the above process or portions thereof may be under computer control. For patterns and designs which do not lend themselves to computer assisted machining, traditional mold and pattern making methods can be used. Sculpting and texture transfer to silicone molds are examples. Preferably, the casting part 40 is provided with a release coating (not shown) such as a silicon release agent, a wax in the carnauba wax family, TEFLON® (a trademark of the E.I. DuPont de Nemours Company, Wilmington, Del.), zinc stearate, or any similar material which will function as a release agent for the particular resin material being used to create the first lamina 37.

Figure 5:
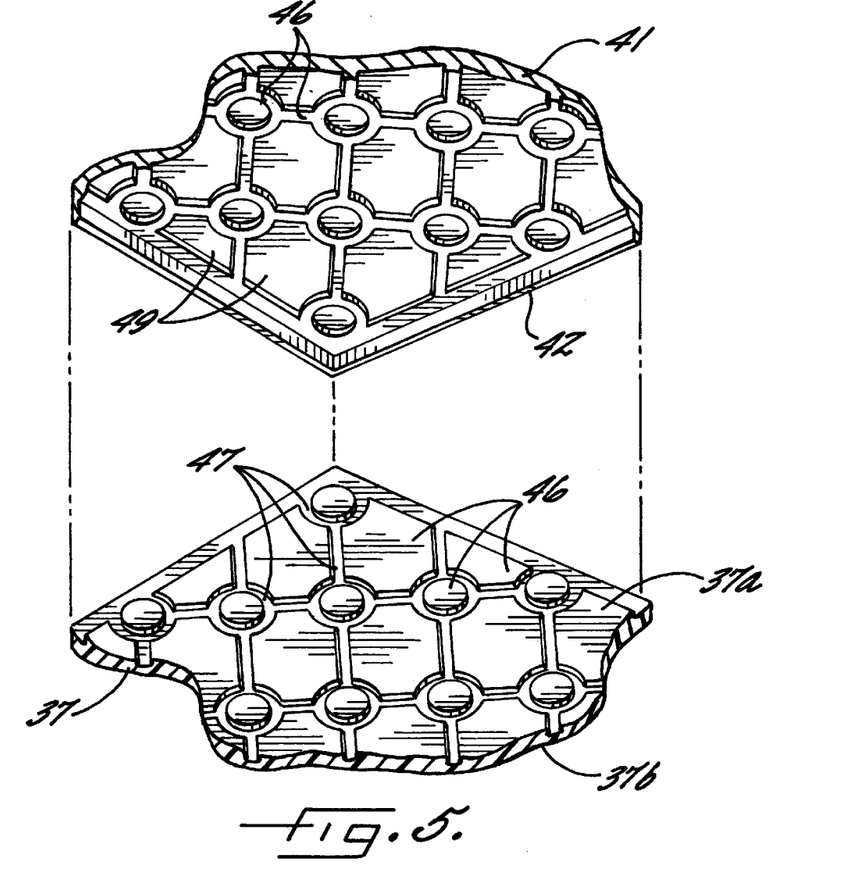
FIG. 5 illustrates removing from the casting part a first lamina formed from the first resin.

In the initial step of forming 10 the first lamina 37, a first thermosetting resin 44 is applied to the base 41 (FIG. 4) such as using a nozzle or any other known means for applying the resin. Curing 15 the first thermosetting resin 44 is the next step. Curing may occur at room temperature, for example between about 15° C. and 38° C., or at elevated temperatures, for example, between about 100° C. and 150° C. The specific curing temperature and curing time may vary and will depend upon the particular resin cast and is information which is well known in the art. After sufficient curing time, the first thermosetting resin 44 is substantially fully polymerized resulting in a first lamina 37. As illustrated in FIG. 5, the first lamina 37, is removed from the base 41 for cooling and further processing. After removal from the base 41, the first lamina 37 may be placed between wooden sheets or other flat substrates (not shown) to help maintain the flatness of the first lamina during cooling.

The surface portion of the first lamina 37 which is in contact with the base 41 is referred to as the face layer 37a, whereas the surface portion of the first lamina opposite the base is referred to as the back layer 37b. The face layer 37a comprises the molded inverse pattern corresponding to the pattern of the base 41. As one having skill in the art would understand, the raised portions 46 of the first lamina 37 correspond with the recessed portions 49 of the base 41. The face layer 37a cures having a substantially finished surface that requires little sanding or processing. By contrast, the back layer 37b has neither the functional nor aesthetic qualities of the face layer 37a. The only requirement of the back layer 37b of the first lamina 37 is that it be substantially parallel to the opposing face layer 37a and be generally smooth to enable the first lamina to be adhesively attached to another surface such that a plurality of first laminae 37 together give the appearance of a continuous surface.

The preparation of the curable first thermosetting resin 44 is well known in the art and generally involves mixing the resin with various filler materials, fiber reinforcement, appropriate catalysts, and desired tinting or pigment materials, referred to as a resin system. Preferred filler materials, such as alumina, trihydrate and/or glass fibers, are selected to impart desired properties to the thermosetting resin. Preferably, the mixing of the thermosetting resin 44 for use in the above process includes mixing under vacuum to remove any air entrapped by the mixing process.

Figure 6:
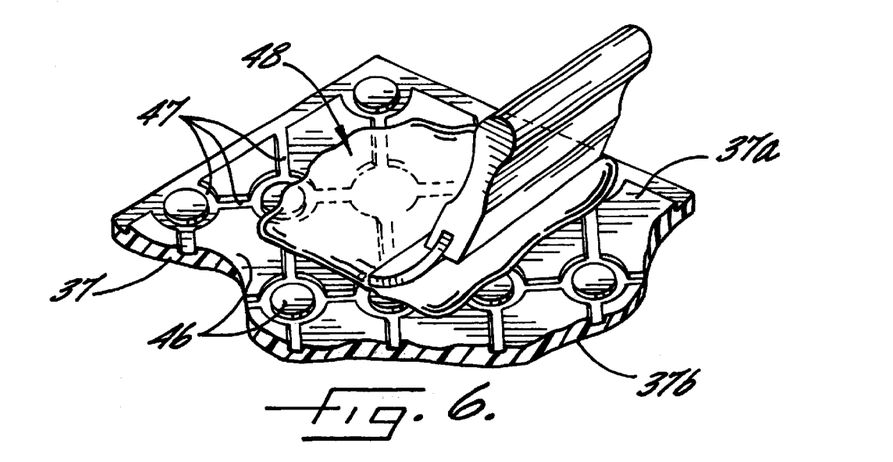
FIG. 6 illustrates applying a second resin to the first lamina.

In the next step of the process, illustrated in FIG. 6, a second curable thermosetting resin 48 is cast 20 onto the face layer 37a of the first lamina 37. The second curable resin 48 is spread over the face layer 37a of the first lamina 37 so as to fill the recesses 47 thereon. Preferably, the second thermosetting resin 48 has a different color than the first thermosetting resin 44.

Figure 7:
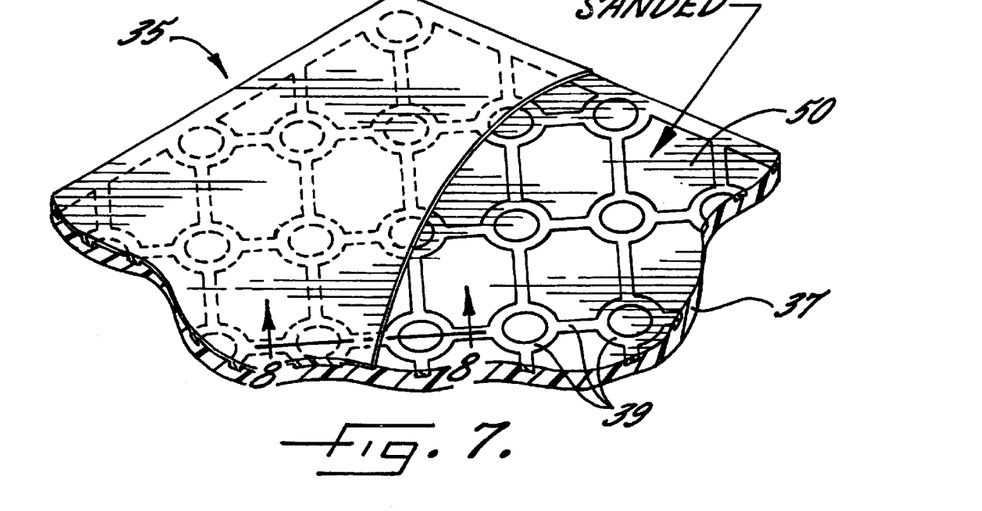
FIG. 7 illustrates a decorative article according to the present invention having a partially sanded face layer comprising first and second laminae.
Figure 8:
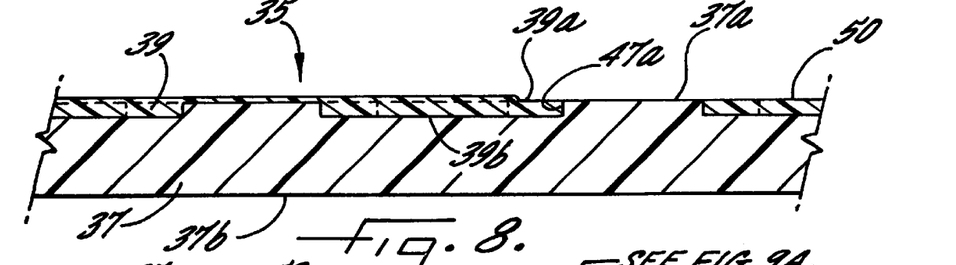
FIG. 8 is a cross-sectional view taken along lines 8—8 in FIG. 7.

In the next step of the process, curing 25 of the second thermosetting resin 48 takes place using conventional techniques, as described in the above-referenced U.S. Pat. No. 5,166,230 to Stecker, and produces a second lamina 39 (FIGS. 7 and 8). Curing may occur at room temperature, for example between about 15° C. and 38° C., or at elevated temperatures, for example, between about 100° C. and 150° C. The specific curing temperature and curing time may vary from the above and will depend upon the particular resin cast and is information which is well known in the art. The resulting second lamina 39 comprises a face layer 39a and a back layer 39b.

In the final step of the process, the combination first and second laminae 37, 39 are subjected to sanding 30 or other treatment to produce a decorative article of manufacture having a desired aesthetic characteristic, for example, a substantially planar face layer. As illustrated in FIGS. 7 and 8, the face layer 39a of the second lamina 39, after curing, extends above the face layer 37a of the first lamina 37. This portion of the face layer 39a is sanded to produce a planar face surface 50 wherein the face layer 37a of the first lamina 37 is substantially flush with the face layer of the second lamina 39. It is recognized that only a portion of the face layer 39a could be sanded to provide a profile to the face layer of the finished article.

Figure 9:
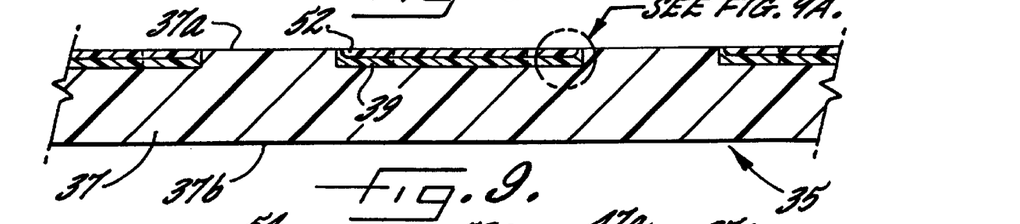
FIG. 9 is a cross-sectional view of a decorative article according to the present invention having first, second and third laminae.
Figure 9A:
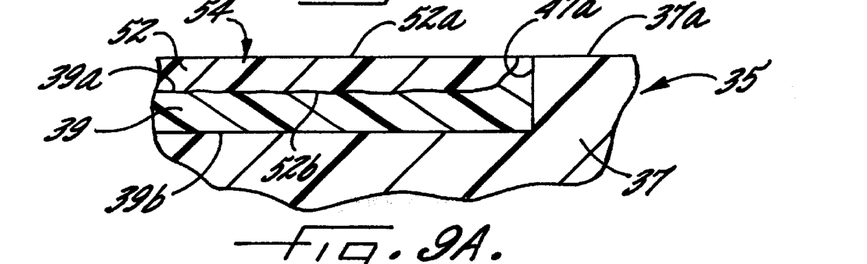
FIG. 9A is an enlarged view of a portion of FIG. 9.

According to another embodiment of the present invention, more than one curable thermosetting resin may be applied to the recessed portions 47 of the first lamina 37. As illustrated in FIGS. 9 and 9a, a second thermosetting resin 48 is applied within recess portion 47 of the first lamina 37 so as not to completely fill the recessed portion. Surface tension between the second thermosetting resin 48 and the side wall 47a of recessed portion 47 causes the second thermosetting resin 48 to form a relatively thin face layer 39a adjacent the face layer 37a of the first lamina 37 when cured. The second thermosetting resin 48 is then cured by conventional techniques, as described above, to produce a second lamina 39 comprising a variable depth face layer 39a and a back layer 39b. Curing may occur at room temperature, for example between about 15° C. and 38° C., or at elevated temperatures, for example, between about 100° C. and 150° C. The specific curing temperature and curing time may vary from the above and will depend upon the particular resin cast and is information which is well known in the art.

In the illustrated embodiment, a third lamina 52 is formed by casting and curing a third curable thermosetting resin 54 on top of the second lamina 39 within the recess 47 of the first lamina 37. The three lamina 37, 39, 52 in the illustrated embodiment are sanded 30 to produce a substantially planar surface, wherein the face layer 37a, 39a, 52a of the first lamina, second lamina, and third lamina are substantially flush with each other. As would be understood by those having skill in the art, one or more additional layers of the same or different curable thermosetting resins may be applied using conventional techniques within the recessed portions 47 of the first lamina 37 to form one or more additional laminae.

Although a variety of resin materials will function satisfactorily, the resin materials should preferably be a thermosetting resin. The term "thermosetting resin" relates to a polymer that solidifies or "sets" irreversibly on heating. Suitable thermosetting resins include polyesters, epoxies, urethanes, or any other similar resins preferably having various volatile components which cure without releasing solvents and/or gases therein. It is recognized that some polymers although technically "thermoplastics" could be used in the present invention with the proviso that they do not flow under conditions to which the article is typically subjected and the cured resin can be post finished such as sanding. Exemplary polymers of this type are the acrylics.

The thermosetting resins useful herein can vary and include unsaturated polyesters, phenolics, epoxies, polyurethanes, and the like, and mixtures and blends thereof. The unsaturated polyester resins are a particularly preferred resin. Useful unsaturated polyester resins include practically any esterification product of a polybasic organic acid and a polyhydric alcohol, wherein either the acid or the alcohol, or both, provide the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexandediol, 1,7-heptanediol, 1,8-octanediol, 1,9-nonanediol, 1,10-decanediol, 2,10-decanediol, 1,4-cyclohexandediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of a saturated polycarboxylic acid or anhydride with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3-3,-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Useful unsaturated polyhydric alcohols for reacting with the saturated polycarboxylic acids include ethylenic unsaturation-containing analogs of the above saturated alcohols (e.g., 2-butene-1,4-diol). The unsaturated polyester resins are generally crosslinked with a compatible crosslinking monomer such as styrene, vinyl toluene, methyl methacrylate, methyl styrene, divinyl benzene, diallyl phthalate and the like.

The amount of polyester thermosetting resin in the resin system ranges from about 35 percent to about 100 percent by weight of the total resin system. The amount of crosslinking monomer is about 10 percent to about 65 percent by weight of the resin system.

The polyester resin can also be mixed or blended with other thermosetting resins. For example, the polyester resin can be mixed with a crosslinking polyurethane such as described in U.S. Pat. No. 4,062,826 to Hutchinson et al., the disclosure of which is incorporated herein by reference. Polymerization of this mixture can occur by a condensation reaction. A homogenous mixture of an unsaturated polyester resin and a crosslinkable polyurethane precursor having at least one free isocyanate group to react with the end groups of the polyester resin is formed. For example, a crosslinkable polyurethane comprising at least one polyfunctional compound containing groups reactive with isocyanate groups and at least one polyisocyanate can be used. The isocyanate is activated by the first reaction conditions and the chain extension reaction takes place to partially polymerize the resin blend to a semi-solid mass. Exemplary polyisocyanates include methylene di-p-phenylene isocyanate ("MDI") isophorone diisocyanate ("IPDI") and toluene diisocyanate ("TDI"). The second reaction conditions can be activating additional polyisocyanate to fully polymerize the resin blend or can be activating a free radical initiator in the blend to fully polymerize the same. The use of other thermosetting resins will be within the skill of one in the art.

Exemplary room temperature free radical initiators include hydrogen peroxide and methyl ethyl ketone peroxide ("MEKP") noting that most commercially available MEKP includes some hydrogen peroxide.

Exemplary peroxy-type free radical polymerization initiators are the hydroperoxides such as tert-butyl hydroperoxide, 2,5-dimethylhexane-2,5-dihydroperoxide, cumene hydroperoxide, para-methane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide; 2,4-dichlorobenzoyl peroxide, lauroyl peroxide and the like. Also azo promoters such as azobisbutrylnitrile can be used. The amount of first and second curing agents used is dependent on the time desired for thermosetting, but is typically a short period of time (i.e., less than 3 hours, typically less than 2 hours and often less than 1 hour). The amount used is about 0.01 to about 0.1 percent by weight of the first curing agent and about 0.1 to about 5 percent by weight of the second curing agent.

The resin system can also include various additives commonly employed in thermosetting resin compositions such as fillers, colorants, veining pigments, thixotropic agents, chemical thickening agents, casting part release agents, low profile additives, fiber reinforcement, and other additives for imparting desirable properties such as hardness, color, flame retardancy, aesthetic appearance, smoothness, clarity and the like. Fibers added may include glass, carbon, metals, and the like. Additionally, resins may be selected having a degree of translucency allowing the colors of other resins used to be visible. A variety of desired aesthetic characteristics can be achieved by selecting resins having different colors and properties, as would be understood by those having skill in the art.

Exemplary fillers can include, among others, alumina trihydrate, quartz powder, marble powder, crushed silica, calcium carbonate, clay, glass fibers, powdered metals, mixtures thereof and other mineral and inorganic particulates that contribute to the aesthetics of the final article. The fillers are used in amounts of about 20 to about 300 percent by weight of resin.

Various colorants and veining pigments can be added for purposes of providing background color and other aesthetically pleasing features to the resin system and shaped article. For example, tinting pigments such as titanium dioxide and the like can be added or a trace amount of carbon black can be swirled in to contribute to the marble-like appearance. The amount used is typically less than about 3 percent by weight.

Thixotropic agents are agents which cause the viscosity of the resin system to vary as a function of its state of agitation and the previous history of motion within the fluid. These agents are preferably used to maintain the filler and other additives in suspension while the resin is curing. Generally, the viscosity of a thixotropic fluid decreases as its state of agitation and length of agitation increases, and increases as its state of agitation and length of agitation decreases. An exemplary thixotropic agents is fumed silica. The amount used is typically less than about 1 percent by weight.

Exemplary chemical thickening agents are hydroxides of metals of Group I, II, and IV of the periodic table such as magnesium oxide, calcium oxide, zinc oxide, magnesium hydroxide, calcium hydroxide, and the like. The thickeners are used in amounts of about 0.5 to about 10 percent by weight, and preferably in amounts of about 1 to about 5 percent by weight.

Other additives can include flame retardants, antioxidants, inhibitors (e.g., hydroquinone and benzoquinone), UV radiation absorbers and the like.

The present invention and its advantages over the prior art will be more fully understood and appreciated from the illustrative examples which follow. It is to be understood that the examples are for the purpose of illustration and is not intended as being limiting upon the scope of the invention. A person skilled in the applicable arts will appreciate from these examples that this invention can be embodied in many different forms other than as is specifically disclosed.

EXAMPLE 1

A mixture comprising the following was prepared (percents are given by weight based on total weight of resin): 66% aluminum trihydrate (available from R J Marshall Company, 26776 W. Twelve Mile Road, Southfield, Mich. 48034 as Filler # DF40); 34% ISONPG resin (available from Reichhold Chemical Company, Research Triangle Park, N.C., as # 31211); 2% $TiO_2$ pigment (available from HK Research, 908 Lenoir Road, Hickory, N.C. 28603); 0.6% Trigonox elevated temperature initiator (available from Akzo Chemicals, 300 South Riverside Plaza, Chicago, Ill. 60606 as Trigonox # 141); and 0.2% Perkadox 16 elevated temperature initiator (available from Akzo Chemicals, 300 South Riverside Plaza, Chicago, Ill. 60606 as Perkadox # 16).

The resin system was mixed by a vacuum mixing machine to degasify the mixture. The resin system was poured into the casting part base, and spread evenly with a doctor blade to a depth of ¼". The casting part base and resin was vibrated for sixty seconds to further degasify. The casting part was placed in a vacuum press, such as described in the above-referenced U.S. Pat. No. 5,166,230 to Stecker, and subjected to a pressure of 150 psi and a temperature of 230° F. for 4 minutes to fully cure the first lamina. The first lamina was removed from the casting part, placed between two wooden sheets to maintain flatness, and allowed to cool to room temperature.

The recessed portions of the first lamina were filled with an identical resin system except that MEKP initiator at 2% was used to cure the second resin at room temperature. Black pigment was substituted for white pigment in first matrix. The resulting product was a first lamina having a second lamina contained within recessed portions thereof. The face layer of the first and second laminae were sanded with a sander to produce a decorative planar face wherein the face layer of the first lamina was substantially flush with the face layer of the second lamina. The planar face was finally sanded by hand.

EXAMPLE 2

A first lamina was produced as in Example 1 above using the same thermosetting resin system. A second lamina was prepared by partially filling the recessed portions in the first lamina to create a decorative article having first and second laminae simulating ceramic tiles surrounded by grout. This was done by spraying Seagrave F.921301 omniplet steel grey granite simulation materials (Seagrave Industrial Coatings, Carlstadt, N.J.) through a Binks #7 spray gun, and partially filling the voids. The sanded surface then leaves a tile and recessed grout appearance.

EXAMPLE 3

A first lamina was produced as in Example 1 above except that the resin system mixture comprised the following (percents are given by weight based on total weight of resin): 66% Aluminum trihydrate (available from R J Marshall Company, 26776 W. Twelve Mile Road, Southfield, Mich. 48034 as Filler # DF40); 34% cobalt promoted ISONPG resin (available from Reichhold Chemical Company, Research Triangle Park, N.C., as PolyLite # 31210); 2% $TiO_2$ pigment (available from HK Research, 908 Lenoir Road, Hickory, N.C. 28603); 2% MEKP catalyst (available from ATOCHEM, Military Road, Buffalo, N.Y. 14240 as LUPERSOL DDM-9).

The first lamina was allowed to cure to a firm gel stage for 20 minutes and then subjected to a pressure of 50 psi for 1 hour. The second lamina was created following the steps of Example 1 or Example 2 above.

EXAMPLE 4

A casting part was prepared based on an interlocking pattern of irregular pebble-like form. The casting part was cut from a solid high density polyethylene sheet to a depth of 0.070". The casting part was machined with a CNC Router from a scanned piece of art work. The following polyester compound was prepared (percents are given by weight based on total weight of resin): 50% ISONPG Resin (available from HK Research, 908 Lenoir Road, Hickory, N.C. 28603 as # HKR0050); 50% ATH Filler (available from R J Marshall Company, 26776 W. Twelve Mile Road, Southfield, Mich. 48034 as Filler # DF40); 0.6% off white pigment (available from HK Research, 908 Lenoir Road, Hickory, N.C. 28603); 1% MEKP catalyst (available from Atochem, Military Road, Buffalo, N.Y. 14240, as LUPERSOL DDM-9).

This mixture was poured into casting part and allowed to cure for one hour. A second compound with the same chemistry, but with a brown pigment was brushed over the recessed portions in the first lamina created by the raised portions of the casting part. This material coated the sides and bottoms of the recessed portions around the pebbles. This material was allowed to cure 15 minutes. A third material was then prepared with the same chemistry but with a tan pigment. This material was then placed by doctor blade into the recessed portions. This material was oven cured at 110° C. for 2 hours. The upper face was sanded away to reveal the desired pattern.

The "pebbles" were surrounded by the brown lines and pathways of contrasting tan lines. Thus a three color panel was produced. The low pigment level caused the panel to be translucent, giving the appearance of great depth.

EXAMPLE 5

A piece of natural slate was prepared as a mold surface with HiLo liquid mold release wax (Finish Kare Products, Inc., 1726 Floradale Ave., South El Monte, Calif. 91733). A black casting was made and removed from the slate. The irregular pattern was then filled with a second white pigmented resin compound of contrasting semi-translucent resin using a doctor blade. The panel was cured and sanded to expose the high points of the initial black casting. A wispy pattern resulted with colors of gray from white to black created by the different depths of the second resin casting.

EXAMPLE 6

A polyethylene casting part was prepared with a pattern of overlapping flowers, cut to various depths. The steps in the previous examples were followed, with the use of red and yellow pigments. The resulting panel presented an ethereal image of flowers with an interplay of yellow, orange and red colors, caused by the "read-through" of red through the translucent yellow resin.

EXAMPLE 7

A casting part was prepared from a stucco-like plaster textured surface. A reverse image was processed by pouring SI 1000 silicone rubber (Silicones, Inc., P.O. Box 363-211, Woodbind Street, High Point, N.C. 27261) over the waxed plaster surface. A wooden frame contained the silicone. The rubber was cured for 16 hours and removed from the plaster. A female image of the textured surface was obtained. The mold was then used as in Example 5 to provide a three color panel. In a variation of the procedure the second resin mixture was sprayed through a Binks #7 spray gun at 80 psi.

In the drawings and specification, there have been disclosed typical preferred embodiments of the invention and, although specific terms are employed, they are used in a generic and descriptive sense only and not for purposes of limitation, the scope of the invention being set forth in the following claims.

EXAMPLE 8

The procedure used in Example 4 was followed except the final casting step with the doctor blade was omitted. The resulting panel when sanded had raised pebble like areas with recessed areas surrounding each flat pebble.

What is claimed is:

1. A process for making a decorative article of manufacture, the process comprising:
    (a) forming a first lamina having a face layer with a relief and a substantially planar back layer, said first lamina formed from a first curable thermosetting resin;
    (b) curing the first curable thermosetting resin;
    (c) casting a second curable thermosetting resin onto the face layer of the first lamina to follow the relief thereof and to form a second lamina having a face layer and a back layer, said second lamina formed substantially from said second curable thermosetting resin;
    (d) curing the second curable thermosetting resin; and
    (e) removing a portion of the first lamina face layer and the second lamina face layer to provide a decorative article of manufacture having a substantially planar face layer.

2. The process according to claim 1 wherein the first curable thermosetting resin is selected from the group consisting of unsaturated polyesters, acrylics, epoxies, phenolics and polyurethanes, and blends and mixtures thereof.

3. The process according to claim 1 wherein the second curable thermosetting resin is selected from the group consisting of unsaturated polyesters, acrylics, epoxies, phenolics and polyurethanes, and blends and mixtures thereof.

4. The process according to claim 1 wherein the first thermosetting resin and the second thermosetting resin are the same resin.

5. The process according to claim 1 wherein step (b) includes heating the first thermosetting resin to a temperature of about 100 to 150° C. at 80 to 1000 psi.

6. The process according to claim 1 wherein step (b) includes curing the first thermosetting resin at a temperature of between 15° C. and 38° C.

7. The process according to claim 1 wherein step (d) includes heating the second thermosetting resin to a temperature of about 100 to 150° C. at 80 to 1000 psi.

8. The process according to claim 1 wherein step (d) includes curing the second thermosetting resin at a temperature of between 15° C. and 38° C.

9. A process for making a decorative article of manufacture, the process comprising:
    (a) forming a first lamina having a face layer with a relief and a substantially planar back layer, said first lamina formed from a first curable thermosetting resin;
    (b) curing the first curable thermosetting resin;
    (c) casting a second curable thermosetting resin onto the face layer of the first lamina to follow the relief thereof and to form a second lamina having a face layer with a relief and a back layer, said second lamina formed from a second curable thermosetting resin;
    (d) curing the second curable thermosetting resin;
    (e) casting a third curable thermosetting resin onto the face layer of the second lamina to follow the relief thereof and to form a third lamina having a face layer and a back layer, said third lamina formed from a third curable thermosetting resin;

(f) curing the third curable thermosetting resin; and (g) removing a portion of the first lamina face layer, the second lamina face layer, and the third lamina face layer to provide a decorative article of manufacture having a substantially planar face layer.

10. The process according to claim 9 wherein the first curable thermosetting resin is selected from the group consisting of unsaturated polyesters, epoxies, phenolics and polyurethanes, and blends and mixtures thereof.

11. The process according to claim 9 wherein the second curable thermosetting resin is selected from the group consisting of unsaturated polyesters, epoxies, phenolics and polyurethanes, and blends and mixtures thereof.

12. The process according to claim 9 wherein the third curable thermosetting resin is selected from the group consisting of unsaturated polyesters, epoxies, phenolics and polyurethanes, and blends and mixtures thereof.

13. The process according to claim 9 wherein the first thermosetting resin, the second thermosetting resin, and the third thermosetting resin are the same resin.

14. The process according to claim 9 wherein step (b) includes heating the first thermosetting resin to a temperature of about 100 to 150° C. at 80 to 1000 psi.

15. The process according to claim 9 wherein step (b) includes curing the first thermosetting resin at a temperature of between 15° C. and 38° C.

16. The process according to claim 9 wherein step (d) includes heating the second thermosetting resin to a temperature of about 100 to 150° C. at 80 to 1000 psi.

17. The process according to claim 9 wherein step (d) includes curing the second thermosetting resin at a temperature of between 15° C. and 38° C.

18. The process according to claim 9 wherein step (f) includes heating the third thermosetting resin to a temperature of about 100 to 150° C. at 80 to 1000 psi.

19. The process according to claim 9 wherein step (f) includes curing the third thermosetting resin at a temperature of between 15° C. and 38° C.

* * * * *